United States Patent [19]
Butts et al.

[11] Patent Number: 5,261,789
[45] Date of Patent: Nov. 16, 1993

[54] TIP COOLED BLADE

[75] Inventors: Don Butts, Swampscott, Mass.; John G. Nourse, Gansevoort, N.Y.; Robert C. Simmons, Springdale, Ohio

[73] Assignee: General Electric Company, Cincinnati, Ohio

[21] Appl. No.: 935,065

[22] Filed: Aug. 25, 1992

[51] Int. Cl.⁵ .............................................. F01D 5/18
[52] U.S. Cl. .................. 416/96 R; 415/115; 416/97 R; 416/97 A; 416/95
[58] Field of Search ............... 415/115, 170.1, 171.1, 415/173.1; 416/97 R, 97 A, 95, 96 R, 96 A

[56] References Cited
U.S. PATENT DOCUMENTS

| | | | |
|---|---|---|---|
| 3,635,585 | 1/1972 | Metzler, Jr. | 416/96 |
| 3,854,842 | 12/1974 | Caudill | 415/116 |
| 4,010,531 | 3/1977 | Andersen et al. | 29/156.8 H |
| 4,142,824 | 3/1979 | Andersen | 415/115 |
| 4,224,011 | 9/1980 | Dodd et al. | 416/97 R |
| 4,390,320 | 6/1983 | Eiswerith | 415/115 |
| 4,411,597 | 10/1983 | Koffel et al. | 416/92 |
| 4,424,001 | 1/1984 | North et al. | 416/92 |
| 4,606,701 | 8/1986 | McClay et al. | 416/92 |
| 4,893,987 | 1/1990 | Lee et al. | 416/92 |
| 4,940,388 | 7/1990 | Lilleker et al. | 416/97 R |

FOREIGN PATENT DOCUMENTS 2077363 12/1981 United Kingdom .

OTHER PUBLICATIONS

W. Aung et al., "Heat Transfer in Tubulent Separated Flow Downstream of a Rearward-Facing Step," Isreal Journal of Technology, vol. 10, No. 1-2, 1972, pp. 35-41.

Primary Examiner—Edward K. Look
Assistant Examiner—Mark Sgantzos
Attorney, Agent, or Firm—Jerome C. Squillaro; Nathan D. Herkamp

[57] ABSTRACT

A gas turbine engine blade includes an airfoil having first and second sides and a dovetail extending from the airfoil root. The airfoil includes a tip having a tip floor with first and second tip walls extending from the floor and spaced apart to define therebetween a tip pienum. The first tip wall is recessed at least in part from the airfoil first side to define an outwardly facing tip shelf, with the tip shelf and the first tip wall defining therebetween a trough. A plurality of cooling holes extend through the tip floor at the tip shelf for channeling cooling air from a flow channel inside the airfoil into the trough for cooling the blade tip.

11 Claims, 2 Drawing Sheets

TIP COOLED BLADE

The U.S. Government has rights in this invention pursuant to Contract No. F33657-81-C-2006 awarded by the Department of the Air Force.

The present invention relates generally to gas turbine engines, and, more specifically, to a gas turbine engine rotor blade having improved tip cooling.

BACKGROUND OF THE INVENTION

A gas turbine engine includes one or more turbine blade rows disposed downstream of a combustor which extract energy from combustion gases generated thereby. Disposed radially outwardly of the rotor blade tips is a stator shroud which is spaced from the blade tips to provide a relatively small clearance therebetween for reducing leakage of the combustion gases over the blade tips during operation. Each of the rotor blades includes conventionally known pressure and suction sides which are preferentially aerodynamically contoured for extracting as much energy as possible from the combustion gases flowable thereover. The pressure and suction sides extend to the blade tip and are disposed as close as possible to the stator shroud for maximizing the amount of energy extracted from the combustion gases. However, the clearance between the blade tips and the stator shroud must nevertheless be adequate to minimize the occurrence of blade tip rubs during operation which may damage the blade tips.

Turbine rotor blades are typically hollow for channeling therethrough cooling air which is provided from a conventional compressor of the gas turbine engine to cool the blades from the heat flux generated by the combustion gases flowing thereover. The tip, or tip cap, portion of the blades is particularly susceptible to the damaging effects of the hot combustion gases and must be suitably cooled for reducing blade tip distress in the form of oxidation and thermal fatigue during operation. As the blade tip erodes during operation due to the blade tip distress, the pressure and/or suction sides of the blade are adversely affected which decreases the aerodynamic performance efficiency of the blade for extracting energy from the combustion gases. And, such erosion of the blade tip also increases the clearance between the blade tip and the stator shroud which allows more of the combustion gases to leak over the blade tip, and, therefore, extraction of the energy therefrom is lost which also decreases aerodynamic efficiency.

Numerous conventional blade tip cap designs exist for maintaining the proper pressure and suction side flow surfaces of the blade at the tip cap as well as providing minimum clearances with the stator shroud. Numerous cooling configurations also exist for cooling the blade tip caps for obtaining useful lives of the blades without undesirable erosion thereof. Since cooling of the blade, including the blade tip, uses a portion of the compressed air from the gas turbine compressor, that air is unavailable for combustion in the combustor of the engine which decreases the overall efficiency of the gas turbine engine. Accordingly, cooling of the blade, including the blade tip, should be accomplished with as little compressed air as possible to minimize the loss in gas turbine engine efficiency.

Conventional blade cooling configurations typically include film cooling apertures extending through the blade pressure and suction sides for channeling the cooling air from inside the blade to the outer surfaces of the blade for providing conventional film cooling thereof. The film holes must be suitably aligned with each other on the blade outer surface which is typically accomplished by using a conventional reference datum located on the blade dovetail. However, manufacturing tolerances and stack-up tolerances result in random inaccuracy in position of the film cooling holes adjacent to each other which affect the ability to provide the designed-for cooling thereof. Yet further, the film cooling holes typically extend at inclination angles through the blade walls which result in elliptical outlet holes along the outer surface of the blade. In conventional radially inclined holes, the major axis of the film cooling outlet also extends radially which provides an undesirable stress concentration of the principle thermal stresses within the blade which extend generally in the axial direction, for example. These stress concentrations must be suitably accommodated in the design of the rotor blade for obtaining a useful service life thereof.

SUMMARY OF THE INVENTION

A gas turbine engine blade includes an airfoil having first and second sides and a dovetail extending from the airfoil root. The airfoil includes a tip having a tip floor with first and second tip walls extending from the floor and spaced apart to define therebetween a tip plenum. The first tip wall is recessed at least in part from the airfoil first side to define an outwardly facing tip shelf, with the tip shelf and the first tip wall defining therebetween a trough. A plurality of cooling holes extend through the tip floor at the tip shelf for channeling cooling air from a flow channel inside the airfoil into the trough for cooling the blade tip.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
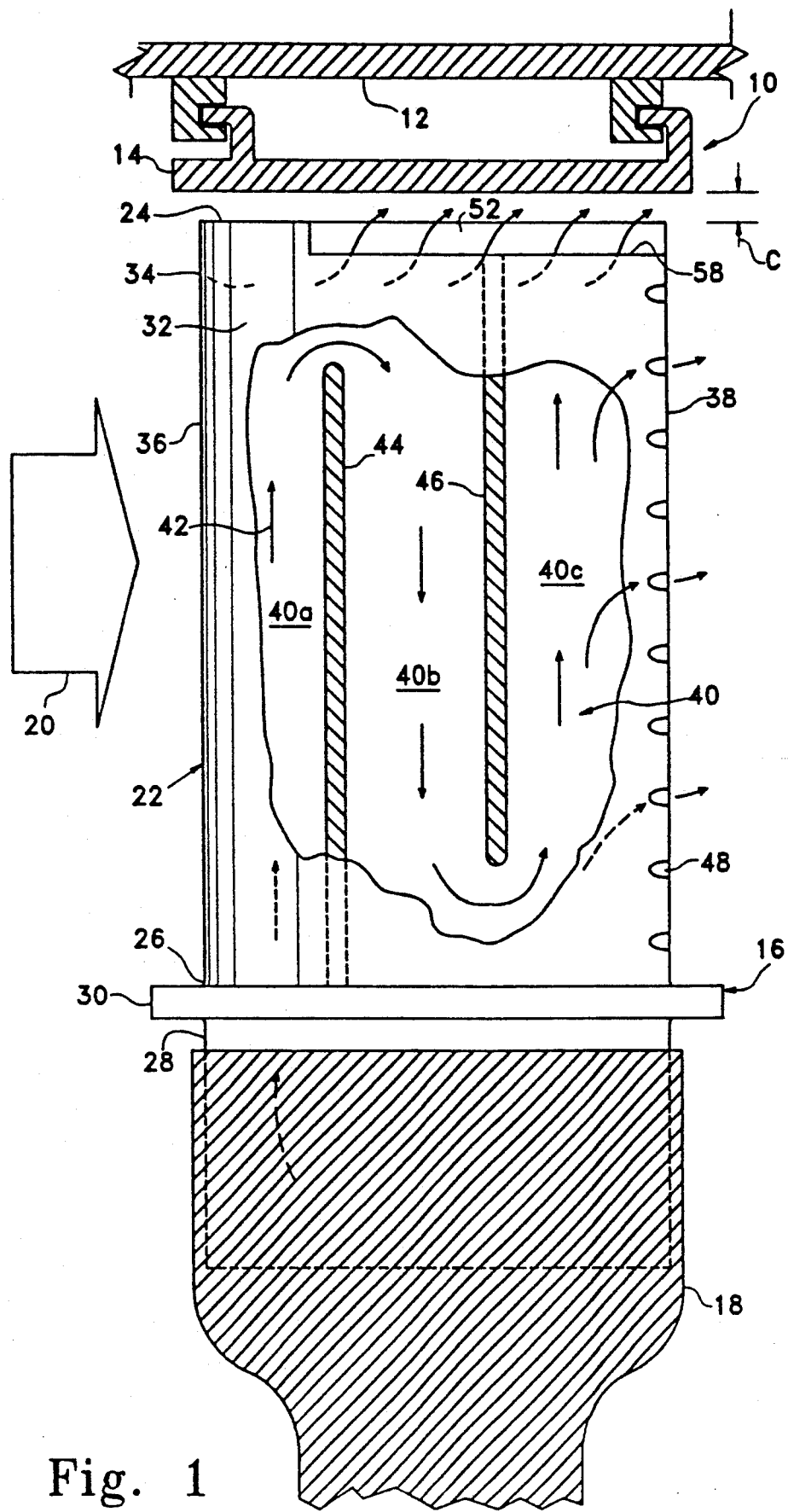
FIG. 1 is a schematic, axial, partly sectional view of a gas turbine engine rotor blade row in accordance with one embodiment of the present invention.

Illustrated schematically in FIG. 1 is an exemplary high pressure turbine rotor blade stage 10 of a gas turbine engine used for powering an aircraft, for example. The turbine stage 10 includes an annular casing 12 which supports a conventional annular stator shroud 14. A plurality of turbine rotor blades 16 in accordance with a preferred and exemplary embodiment of the present invention are conventionally joined to a rotor disk 18. The turbine stage 10 is disposed downstream of a conventional combustor (not shown) which generates combustion gases 20 which flow between the turbine blades 16 from which energy is extracted by the blades 16 for rotating the rotor disk 18 as is conventionally known.

Each of the turbine blades 16 includes a hollow airfoil 22 having a radially outer tip, or tip cap, 24 disposed adjacent to the stator shroud 14 to define therebetween a tip clearance C which is conventionally small for reducing leakage of the combustion gases 20 over the airfoil tip 24. The airfoil 22 also includes a root 26 from which extends a conventional axial-entry dovetail 28 which is positioned in a complementary dovetail groove in the perimeter of the rotor disk 18 for mounting the blade 16 thereto. The blade 16 also includes a conventional platform 30 formed integrally therewith at the juncture between the airfoil 22 and the dovetail 28 which provides a radially inner flowpath boundary for the combustion gases 20 which flow between adjacent airfoils 22.

The airfoil 22 also includes a first side 32, which is generally outwardly concave and conventionally known as a pressure side, which is joined to a second, opposite side 34, which is generally outwardly convex and conventionally known as a suction side, with the first and second sides 32 and 34 being joined together at axially spaced apart, radially extending leading and trailing edges 36 and 38, respectively. The first and second sides 32 and 34 extend from the airfoil root 26 to the tip 24 and between the leading and trailing edges 36 and 38 and are laterally spaced apart to define a conventional serpentine flow channel 40 therein for channeling cooling air 42 through the airfoil 22 for the cooling thereof. The cooling air 42 is provided from a compressor (not shown) of the gas turbine engine and is conventionally channeled through the rotor disk 18 and through the dovetail 28 into the airfoil 22.

In this exemplary embodiment, the airfoil 22 further includes a forward partition 44 which extends radially upwardly from the airfoil root 26 to adjacent the blade tip 24 and laterally between the airfoil first and second sides 32 and 34 to define a forward portion 40a of the flow channel 40 disposed in series flow with a mid-chord portion 40b of the flow channel 40. An aft partition 46 extends downwardly from the airfoil tip 24 to adjacent the airfoil root 26 to define with the forward partition 44 the flow channel mid-chord portion 40b, and with the trailing edge 38 defines an aft portion 40c of the flow channel 40. The cooling air 42 is first channeled upwardly through the forward portion 40a inside along the leading edge 36 and is then turned around the forward partition 44 and flows downwardly through the mid-chord portion 40b toward the airfoil root 26, and then, is again turned upwardly through the aft portion 40c for flow along the trailing edge 38 and is discharged therethrough through a plurality of radially spaced apart trailing edge apertures 48. In this way, the cooling air 42 effectively cools both airfoil first and second sides 32 and 34 from the root 26 to adjacent the tip 24. Of course, the airfoil 22 may include additional film cooling holes therethrough as is conventionally known, and may also include various turbulators or related structures inside the airfoil 22 itself for enhancing heat transfer therein for better cooling the airfoil 22 from the heat flux transmitted thereto by the combustion gases 20 during operation.

Figure 2:
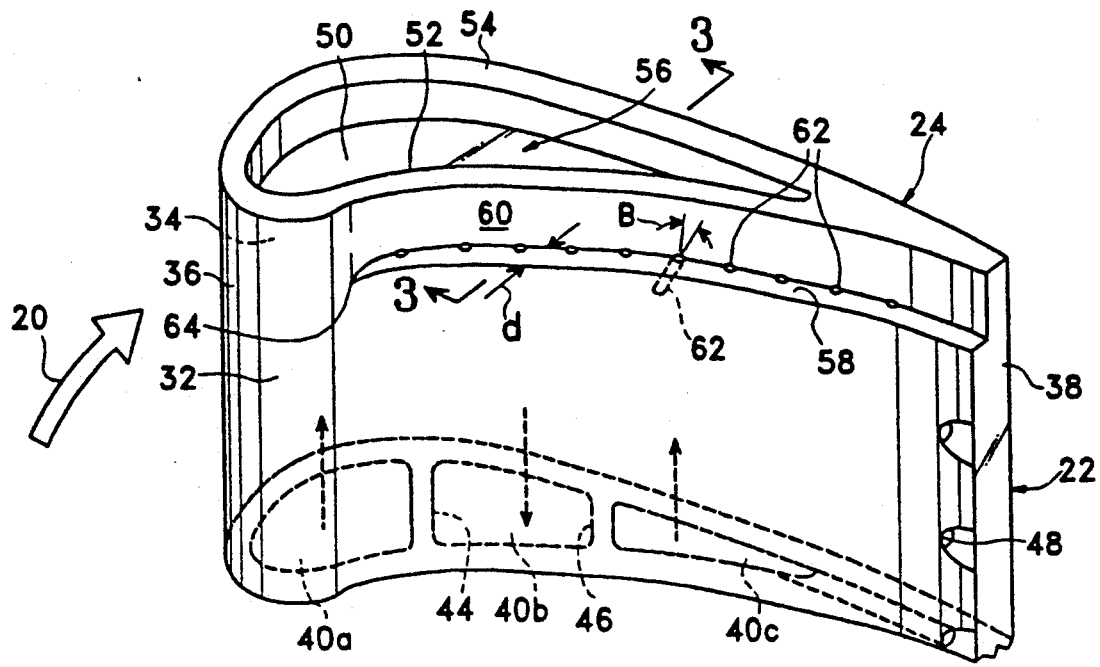
FIG. 2 is a perspective view of the tip portion of the blade illustrated in FIG. 1.
Figure 3:
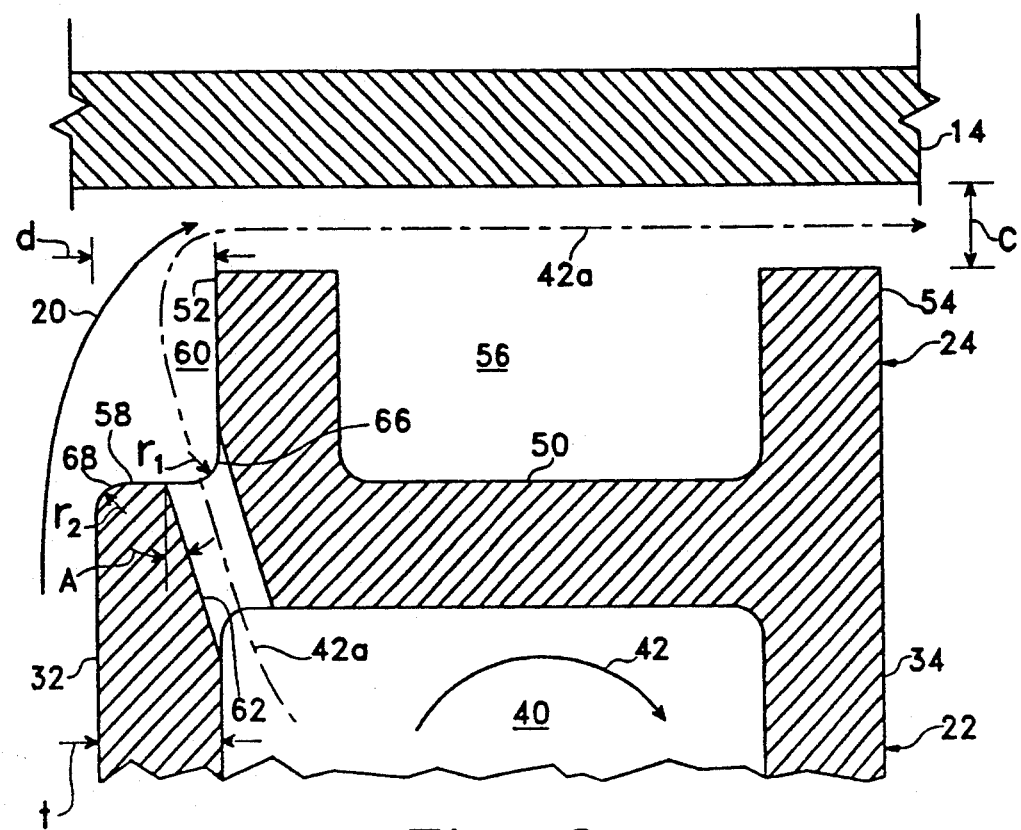
FIG. 3 is a transverse sectional view of the tip portion of the blade illustrated in FIG. 2 taken along line 3—3.

As shown in more particularity in FIGS. 2 and 3, the airfoil 22 includes an improved tip 24 in accordance with a preferred embodiment of the present invention. More specifically, the tip 24 includes a tip floor 50 which extends between the airfoil first and second sides 32 and 34 and between the leading and trailing edges 36 and 38 for enclosing the airfoil 22 at the tip 24 for containing the cooling air 42 in the flow channel 40 by providing an upper boundary therefor. The tip 24 further includes a first tip wall 52 disposed on the airfoil first, or pressure side 32 for forming a part or extension thereof, with the first tip wall 52 being also referred to as a pressure-side wall 52. The first tip wall 52 extends radially upwardly from the tip floor 50 at the airfoil first side 32. A second tip wall 54 is disposed on the airfoil second, or suction side 34 and extends radially upwardly from the tip floor 50 at the airfoil second side 34 forming a part or extension thereof, and is also referred to as a suction-side tip wall 54. The second tip wall 54 is spaced at least in part from the first tip wall 52 to define therebetween a radially outwardly facing, open tip plenum 56.

As shown more clearly in FIG. 2, the first and second tip walls 52 and 54 are initially joined together at the trailing edge 38 and then separate apart over the flow channel aft portion 40c and continue along both airfoil sides 32 and 34 until they join each other at the leading edge 36. Accordingly, the tip plenum 56 extends from the leading edge 36 rearwardly over the flow channel forward and mid-chord portions 40a and 40b and partially over the flow channel aft portion 40c. In this way, mass and tip rub surface area of the tip 24 may be reduced, and therefore, the input heat flux from the combustion gases 20 may also be reduced, while providing the two laterally spaced apart tip walls 52 and 54 which form an effective seal with the stator shroud 14 as illustrated in FIG. 3 for reducing leakage of the combustion gases 20 through the blade tip clearance C.

As shown in both FIGS. 2 and 3, the first tip wall 52 is preferably recessed at least in part from the airfoil first side 32 in accordance with the present invention for improving cooling of the tip 24. The first tip wall 52 is recessed from the airfoil first side 32 toward the airfoil second side 34 to define a radially outwardly facing tip shelf 58 which extends generally between the leading and trailing edges 36 and 38. The recessed first tip wall 52 and the shelf 58 define therebetween a generally L-shaped trough 60. In the preferred embodiment, the tip floor 50 is preferably imperforate except for a plurality of cooling holes 62 extending through the tip floor 50 at the tip shelf 58 in flow communication between the flow channel 40 and the trough 60 for channeling a portion 42a of the cooling air 42 into the trough 60 for cooling the blade tip 24.

In the exemplary embodiment illustrated in FIGS. 2 and 3, the combustion gases 20 provide maximum heat flux into the airfoil 22 near the mid-chord and trailing edge regions thereof. Accordingly, the tip shelf 58 preferably extend in those regions from the trailing edge 38 towards the leading edge 36 and has a substantially constant depth d until it tapers to a blending point 64 adjacent to the leading edge 36 at which the tip shelf 58 merges or disappears into the airfoil first side 32. Correspondingly, the first tip wall 52 is recessed in from the airfoil first side 32 from the trailing edge 38 until it too blends back to the original contour of the airfoil first side 32 at the blending point 64. In this way, the first tip wall 52 continues to form a portion of the airfoil first or pressure side 32 for maintaining aerodynamic efficiency of flow of the combustion gases 20 thereover for extracting energy therefrom for rotating the disk 18. The depth d of the tip shelf 58, and therefore the depth of the recess for the first tip wall 52, is relatively small and preferably about the size of the thickness t of the airfoil first side 32. In this way, the aerodynamic performance of the combustion gases 20 flowing over the first tip wall 52 at the tip shelf 58 is not appreciably degraded, but improved cooling results.

More specifically, and referring to FIG. 3, the cooling holes 62 discharge the cooling air portion 42a into the trough 60 on the airfoil pressure side 32. The trough 60 provides at least two improved functions: the shelf 58 provides a discontinuity in the airfoil pressure side 32 to cause the combustion gases 20 to separate from the surface thereof as they flow over the first tip wall 52 which decreases the heat transfer capability thereof, and therefore decreases the heat flux into the first tip wall 52; and, the trough 60 provides a region for the cooling air portion 42a to accumulate to provide a film cooling blanket of cooling air between the combustion gases 20 and the first tip wall 52 which, therefore, further protects the first tip wall 52 from the combustion gases 20 while also providing cooling thereof. Since the tip shelf 58 is preferably disposed on the airfoil pressure side 32, the cooling air portion 42 will flow from the trough 60 and over the first tip wall 52 through the blade tip clearance C between the stator shroud 14 and the blade tip 24, and over the tip plenum 56 toward the second tip wall 54 on the airfoil suction side 34. In this way, the cooling air portion 42a itself flows between the stator shroud 14 and the tip cap 24 to reduce the volume of the combustion gases 20 which can flow therebetween which increases efficiency of energy extraction from the airfoil 22 while reducing heat flux from the combustion gases 20 into the blade tip 24.

Referring again to FIG. 3, the first tip wall 52 is preferably recessed from the airfoil first side 32 to position the first tip wall 52 at least in part over the flow channel 40 to further improve cooling of the tip 24. In the preferred embodiment, the depth d of the recess as measured by the depth d of the tip shelf 58 is preferably equal to about the thickness t of the airfoil first side 32 which, therefore, places the entire recessed portion of the first tip wall 52 entirely over the flow channel 40. In this way, the recessed portion of the first tip wall 52 acts as a cooling fin which extends in direct contact through the tip floor 50 to the cooling air 42 within the flow channel 40. In this way, the first tip wall 52 is directly cooled by the cooling air 42 within the flow channel 40, and the heat conducted to the first tip wall 52 through the airfoil first side 32 is reduced since the cooling holes 62 now separate the first tip wall 52 from the airfoil first side 32. The first tip wall 52 is, therefore, cooled both by the cooling air 42 which removes heat therefrom through the tip floor 50, and by the cooling air portion 42a channeled through the cooling holes 62.

The first tip wall 52 as illustrated in FIG. 3 is preferably imperforate and may be made relatively thin by the elimination of the material from the trough 60. In a conventional tip cap design wherein cooling holes pass radially through the middle of a tip wall like the first tip wall 52, the wall must be suitably wide to accommodate the cooling holes with suitable strength. Since the cooling holes 62 do not extend through the middle of the first tip wall 52, the first tip wall 52 may be reduced in width which reduces the heat flux therein from the combustion gases 20 which reduces the requirement for cooling thereof which further improves the tip 24. The reduced mass of the first tip wall 52 also reduces centrifugal loads therefrom which lowers the centrifugal loads through the dovetail 28, and in turn lowers the loads transmitted to the rotor disk 18 which allows the dovetail 28 and rotor disk 18 to be made smaller for further improving overall efficiency of the engine.

Referring again to FIG. 2, the thinner first tip wall 52 wherein it is recessed to form the tip shelf 58 also extends to the trailing edge 38 which reduces the thickness of the integral first and second tip walls 52 and 54 between the trailing edge 38 and the tip plenum 56 which similarly reduces mass which receives heat flux from the combustion gases 20 and therefore reduces the requirement for the cooling thereof, as well as further reduces the centrifugal loads which are carried by the dovetail 28 and the rotor disk 18, which are significant advantages.

The first and second tip walls 52 and 54, including the thinner first tip wall 52 where it forms the tip shelf 58, not only reduces mass, and therefore centrifugal loads, but also reduces the tip surface area which reduces both the area available for heat flux into the blade tip 24 as well as area which may rub against the stator shroud 14 which will reduce deterioration thereof and resulting leakage therepast.

The first tip wall 52 as shown in FIG. 3 preferably extends generally radially outwardly and generally parallel to the airfoil first side 32. And, the tip shelf 58 preferably extends at least in part generally perpendicularly to the first tip wall 52 and the airfoil first side 32 to define the generally L-shaped trough 60 having a 90° included angle. The included angle between the tip shelf 58 and the first tip wall 52 may be varied between about 60° to about 120°. In normal manufacturing practice, the tip shelf 58 meets the first tip wall 52 at a juncture 66 therebetween which is preferably arcuate in transverse section, and preferably has a first radius of curvature $r_1$. And, the tip shelf 58 will join the airfoil first side 32 at a second juncture 68 which is also arcuate and has a second radius of curvature $r_2$. The first and second radii $r_1$ and $r_2$ are preferably made as small as possible to provide relatively short junctures 66 and 68.

In this way, improved flow separation of the combustion gases 20 by the trough 60 will result as the gases 20 flow radially upwardly along the airfoil first side 32 toward the first tip wall 52. The flow separation of the combustion gases 20 reduces the heat flux input into the first tip wall 52 as described above, with the cooling air portion 42a channeled through the trough 60 further separating the combustion gases 20 from the first tip wall 52.

As shown in FIG. 2, the cooling holes 62 are preferably spaced apart along the tip shelf 58 between the leading and trailing edges 36 and 38, and extend through the tip floor 50, as better seen in FIG. 3, from the flow channel 40 to the first juncture 66. As shown in FIG. 3, the cooling holes 62 are radially inclined relative to the airfoil first surface 32 at an acute angle A of about 15° to about 30°. And, as shown in FIG. 2, the cooling holes 62 may be radially inclined in the forward-to-aft or aft-to-forward directions relative to the leading and trailing edges 36 and 38 at a second acute angle B which may be up to about plus or minus 75°. In this way, the cooling air portion 42a channeled from the flow channel 40 into the trough 60 accumulates therein and film cools the first tip wall 52. Since the predominant flow of the combustion gases 20 is from the leading edge 36 toward the trailing edge 38, the cooling air portion 42a channeled through the cooling holes 62 into the trough 60 will flow both in an aft direction toward the trailing edge 38 and radially over the tip 24 in the blade tip clearance C, with the rearward flow in the trough 60 allowing the cooling air portion 42a to build in thickness as it approaches the trailing edge 38 which provides more effective cooling of the first tip wall 52 in the high heat flux region near the mid-chord and trailing edge 38.

Since the cooling holes 62 extend into the tip shelf 58 and do not extent through the top of the first tip wall 52 as in conventional designs, plugging thereof due to blade tip rubs with the stator shroud 14 are virtually eliminated since the entire first tip wall 52 would have to be eroded away before the stator 14 could reach the cooling holes 62.

Since the cooling holes 62 discharge through the first juncture 66 which is recessed from the airfoil first side 32, they are therefore positioned closer to the airfoil second side 34 and the second tip wall 54 than cooling holes exiting instead through the airfoil first side 32, which is expected to further reduce cooling effectiveness of the tip 24 at the second tip wall 54.

Additional benefits provided by the tip shelf 58 include more accurate positioning of the cooling holes 62. Conventional cooling holes formed in a flat airfoil surface are aligned relative to each other using a machining reference datum typically provided at the blade dovetail. Inherent manufacturing and stack-up tolerances provide random differences in position of adjacent cooling holes manufactured in this manner which decrease the efficiency of cooling from such cooling holes. The tip shelf 58 itself may be cast or machined into the airfoil first sides 32 relative to a conventional reference datum, but, however, the cooling holes 62 may then be formed through the tip shelf 58 itself which provides an accurate reference which necessarily improves the accuracy of radial position of the cooling holes 62 along the first juncture 66 therein. Since the cooling holes 62 are more accurately positioned at the tip shelf 58, they may be more accurately positioned relative to the top of the first tip wall 52 since the manufacturing and stack-up tolerances previously obtained using the dovetail reference datum are eliminated and the accuracy of their placement is more accurately obtained by using the tip shelf 58 itself.

Furthermore, conventional inclined cooling holes extending through a flat vertical wall result in elliptical outlets on the outer surface thereof having their major axes extending radially. Since the predominant principle stress in an exemplary turbine blade may extend axially between the leading and trailing edges, the elliptical outlet creates a conventional stress concentration which must be suitably accommodated in the blade design. Since the cooling holes 62 of the present invention have their outlets not in a vertical wall such as the airfoil first side 32 but, at the first juncture 66 through the horizontal tip shelf 58, the resulting outlet apertures are no longer in the form of ellipses having their major axes in the vertical direction. Since the cooling holes 62 have compound inclinations, i.e. angles A and B, the resulting outlets of the cooling holes 62 in the tip shelf 58 are less elliptical and more circular in configuration with reduced stress concentration in the principle stress direction from the leading to trailing edges 36 and 38.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention. For example, the tip shelf 58 could be formed wherever desired around the airfoil 22 including the airfoil second or suction side 34, and may have various lengths as desired for providing improved cooling in the region wherein the tip shelf 58 is located. All of the various advantages of the improved tip 24, including the tip shelf 58, as described above may or may not be obtained for alternate embodiments depending upon the actual location of the tip shelf 58 and the actual configuration of the trough 60 and the cooling holes 62.

Accordingly, what is desired to be secured by Letters Patent of the United States is the invention as defined and differentiated in the following claims:

We claim:

1. A gas turbine engine blade comprising:
   an airfoil including a first side joined to a second side at spaced apart leading and trailing edges to define therein a flow channel for channeling cooling air through said airfoil to cool said airfoil from combustion gases flowable over said first and second sides, said airfoil having a tip and a root;
   a dovetail extending from said airfoil root for mounting said blade to a rotor disk; and said airfoil tip including:
   a tip floor extending between said airfoil first and second sides and between said leading and trailing edges for enclosing said airfoil for containing said cooling air in said flow channel;
   a first tip wall extending from said tip floor at said airfoil first side to form an extension thereof;
   a second tip wall extending from said tip floor at said airfoil second side to form an extension thereof and spaced in part from said first tip wall to define therebetween an outwardly facing tip plenum;
   said first tip wall being recessed at least in part from said airfoil first side to define an outwardly facing tip shelf extending between said leading and trailing edges to provide a discontinuity in said airfoil first side, said first tip wall and said tip shelf defining therebetween a trough; and
   a plurality of cooling holes extending through said tip floor at said tip shelf in flow communication between said flow channel and said trough for channeling a portion of said cooling air into said trough for cooling said blade tip.

2. A blade according to claim 1 wherein said first tip wall is recessed from said airfoil first side to position said first tip wall at least in part over said flow channel.

3. A blade according to claim 2 wherein said first tip wall is imperforate.

4. A blade according to claim 2 wherein said first tip wall extends generally parallel to said airfoil first side.

5. A blade according to claim 4 wherein said tip shelf extends from said trailing edge toward said leading edge and tapers to a blending point adjacent to said leading edge at which said tip shelf merges into said airfoil first side.

6. A blade according to claim 5 wherein said cooling holes are spaced apart along said tip shelf between said trailing and leading edges and extend through said tip floor from said flow channel to a juncture between said tip shelf and said first tip wall.

7. A blade according to claim 6 wherein said juncture is arcuate in transverse section.

8. A blade according to claim 5 wherein;
   said airfoil first side is a concave, pressure side of said airfoil;
   said airfoil second side is a convex, suction side of said airfoil;
   said first tip wall is disposed on said airfoil pressure side; and said second tip wall is disposed on said airfoil suction side.

9. A blade according to claim 8 wherein said cooling holes are spaced apart along said tip shelf between said leading and trailing edges and extend through said tip floor from said flow channel to a juncture between said tip shelf and said first tip wall, said juncture being arcuate in transverse section.

10. A blade according to claim 2 wherein said first sidewall has a thickness, and said tip shelf is recessed at a depth from said first sidewall, with said tip shelf depth being equal to about said first sidewall thickness.

11. A blade according to claim 4 wherein said tip shelf extends generally perpendicularly to said first tip wall and said airfoil first side.

* * * * *